US006963730B2

(12) United States Patent
Chambers et al.

(10) Patent No.: US 6,963,730 B2
(45) Date of Patent: Nov. 8, 2005

(54) METHOD FOR OPERATING A USER STATION IN A CELLULAR COMMUNICATION SYSTEM

(75) Inventors: David Chambers, Bath (GB); Martin Ellis, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 360 days.

(21) Appl. No.: 10/203,778

(22) PCT Filed: Jan. 20, 2001

(86) PCT No.: PCT/EP01/00915

§ 371 (c)(1),
(2), (4) Date: Oct. 23, 2002

(87) PCT Pub. No.: WO01/62017

PCT Pub. Date: Aug. 23, 2001

(65) Prior Publication Data

US 2003/0144002 A1 Jul. 31, 2003

(30) Foreign Application Priority Data

Feb. 15, 2000 (GB) .................................. 0003505

(51) Int. Cl.[7] .............................................. H04B 17/00
(52) U.S. Cl. .................................. 455/67.11; 455/450
(58) Field of Search ............................. 455/453, 452, 455/450, 550.1, 418, 67.11, 419, 432.2, 574, 455/451, 452.1, 452.2, 115.1

(56) References Cited

U.S. PATENT DOCUMENTS

| | | | |
|---|---|---|---|
| 5,583,869 A | | 12/1996 | Grube et al. |
| 5,608,727 A | | 3/1997 | Perreault et al. |
| 5,689,799 A | * | 11/1997 | Dougherty et al. ........ 455/2.01 |
| 5,697,054 A | * | 12/1997 | Andersson ................... 455/524 |
| 5,724,655 A | * | 3/1998 | Grube et al. ................. 455/419 |
| 5,872,775 A | * | 2/1999 | Saints et al. ................. 370/342 |
| 5,946,634 A | * | 8/1999 | Korpela ..................... 455/552.1 |
| 5,970,056 A | * | 10/1999 | Brailean et al. ............. 370/296 |
| 6,138,030 A | * | 10/2000 | Coombes et al. ........... 455/507 |
| 6,223,261 B1 | * | 4/2001 | Ogawa ....................... 711/150 |
| 6,317,755 B1 | * | 11/2001 | Rakers et al. ............... 707/204 |

(Continued)

FOREIGN PATENT DOCUMENTS

EP 0 817 041 A2 1/1998

OTHER PUBLICATIONS

Bharghavan, V. et al. "The Timely Adaptive Resource Management Architecture." *IEEE Personal Communications, IEEE Communications Society, US*, vol. 5. No. 4, Aug. 1998, pp. 20-31.

(Continued)

*Primary Examiner*—Urban Edward
*Assistant Examiner*—Dai Phuong
(74) *Attorney, Agent, or Firm*—Brian M. Mancini; Lalita W. Pace

(57) ABSTRACT

A method of operating a user station in a cellular communications system. The method relates to determining and allocating a plurality of operating resources, including at least one processing resource and at least one cellular communications resource, to a plurality of applications. The method includes assessing application requirements with respect to the processing resources in association with the application's requirements with respect to the cellular communications resources. Also described is corresponding apparatus for operating a user station. Also described is a storage medium storing processor-implementable instructions and a signal carrying processor-implementable instructions.

25 Claims, 2 Drawing Sheets

U.S. PATENT DOCUMENTS

| | | | | |
|---|---|---|---|---|
| 6,470,447 B1 * | 10/2002 | Lambert et al. | ............ | 713/151 |
| 6,490,297 B1 * | 12/2002 | Kraml et al. | ................ | 370/522 |
| 6,526,285 B1 * | 2/2003 | Matsumoto et al. | ........ | 455/457 |
| 6,628,973 B1 * | 9/2003 | Kikuchi | ...................... | 455/418 |
| 2002/0193152 A1 * | 12/2002 | Soini et al. | ................. | 455/569 |
| 2003/0181168 A1 * | 9/2003 | Herrod et al. | ............. | 455/90.3 |

OTHER PUBLICATIONS

Woo, M. et al. "Dynamic Resource Allocation for Multimedia Services in Mobile Communication Environments." IEEE Journal on Selected Areas in Communications, IEEE Inc. vol. 13, No. 5, Jun. 1995, pp. 913-922.

* cited by examiner

METHOD FOR OPERATING A USER STATION IN A CELLULAR COMMUNICATION SYSTEM

FIELD OF THE INVENTION

The present invention relates to operating a user station in a cellular communications system, wherein a plurality of operating resources are allocated to each of a plurality of applications. The invention is applicable to, but not limited to, a cellular radio communications system such as the Universal Mobile Telecommunication System (UMTS) currently under standardisation.

BACKGROUND OF THE INVENTION

In a cellular communications system, the area over which service is provided is divided into a number of smaller areas called cells. Typically, each cell is served from a base transceiver station (BTS) which has a corresponding antenna or antennas for radio transmission to and reception from a user station thereby forming a radio communications link. The user station is often a mobile station. An established harmonised cellular radio communications system is the Global System for Mobile Communications (GSM). A further harmonised system currently being defined is the Universal Mobile Telecommunications System (UMTS), which is intended to provide a harmonised standard under which cellular radio communications networks and systems will provide enhanced levels of interfacing and compatibility with other types of communications systems. This will involve increased levels of data services including provision for multimedia communications.

Within systems such as UMTS or the like, user stations will increasingly be employed as general data terminals required to run or operate a plurality of processing applications simultaneously. Cellular communication user stations conventionally operate more than one processing application simultaneously, although these have tended to be relatively simple applications related to the basic functioning of the user station. Such simple applications share processing resources of the user station, the sharing of resources being conventionally managed by an operating system. It is expected that cellular communication user stations will increasingly resemble fixed local area network (LAN) data terminals, and that consequently the operating systems running on such user stations are expected to increasingly resemble operating systems for fixed LAN data terminals or computers.

However, a problem with the expected trend is that conventional data terminal operating systems for sharing processing resources between different applications running simultaneously are not fully satisfactory when applied to a cellular communications user station, especially a mobile station, as they do not make any accommodation of any special factors introduced by the need to share cellular communications resources, that become relevant due to the involvement of the radio link, between the different applications.

SUMMARY OF THE INVENTION

The present invention advantageously provides a means for balancing or matching respective levels of processing resources and cellular communications resources that are to be shared between a plurality of applications running or to be run simultaneously on a cellular communication user station.

The present invention advantageously allocates a plurality of operating resources to a plurality of applications running simultaneously on a user station. The operating resources consist of one or more processing resources such as processor load, processor time or memory, and one or more cellular communications resources that must be divided between the applications when they are jointly using a radio communications link established between the user station and a BTS or similar of a cellular communications system. As part of the process of determining and allocating respective amounts of one or more of the operating resources to one or more of the applications, one or more application's requirements with respect to one or more of the processor resources is assessed in association with its requirement with respect to one or more of the cellular communications resources. The resource management process and apparatus of the present invention thus tends to improve the balance or match between the different requirements for the different operating resources. The management process is applied to the operation of applications which are either already running or to be run on the user station, or a combination of the two.

In one aspect the present invention provides a method of operating a user station in a cellular communications system which determines amounts of each of a plurality of operating resources including at least one processing resource and at least one cellular communication resource to be allocated to a plurality of applications on the user station, and allocating the determined amounts correspondingly, the method including assessment, for one or more of the applications, of the or each application's usage of one or more processing resources in association with one or more cellular communications resources.

In a second aspect the present invention provides an apparatus for operating a user station in a cellular communication system, including means for assessing the requirements of one or more applications with respect to one or more processing resources when compared to the one or more application's requirements in terms of one or more cellular communications resources.

The present invention also provides a data carrier medium programmed with stored processor-implementable instructions that can be used to control a processor to carry out the method of the present invention. The present invention also provides a signal containing or carrying such instructions.

The present invention also provides a method of operating a user station e.g. a mobile telephone or mobile data terminal, whose operating system for managing its processing applications is adapted or controlled to allocate operating resources between simultaneous applications according to assessments of processing resource requirements taken in association with cellular communications resource requirements.

In a further aspect of the present invention one or more cellular communications resources are further assessed in the light of tariff or other cost factors related to them.

In a further aspect of the present invention one or more hardware resources or attributes or user station characteristics are considered when allocating respective amounts of operating resources to the different applications.

In a further aspect of the present invention historical data such as data indicating applications' actual usage of resources rather than supposed uses of resources are used in an assessment step.

In a further aspect of the present invention a user station comprises a conventional operating system managing a plurality of applications via an operating system application programming interface (API), however, the user station comprises a further resource management function which functions intermediately between the operating system API and the operating system so as to match allocated amounts of different operating resources to the different applications in the light of comparisons of an application's joint requirement for cellular communications resource(s) and processing resource(s), whilst operating invisibly so far as interaction between the operating system API and the operating system is concerned.

In a further aspect of the present invention input or output buffers, or send/receive buffers, for a transmit or receive function or other suitable function of the user station are measured, probed or analysed as a means of determining a requirement or usage of an operating resource.

The cellular communications system can be a GPRS (general packet radio system) or UMTS system or network.

Additional specific advantages are apparent from the following description and figures.

DESCRIPTION OF PREFERRED EMBODIMENTS OF THE INVENTION

The embodiments are hereinafter described by way of example only. The first embodiment will now be described with reference to FIGS. 1 to 3.

Figure 1:
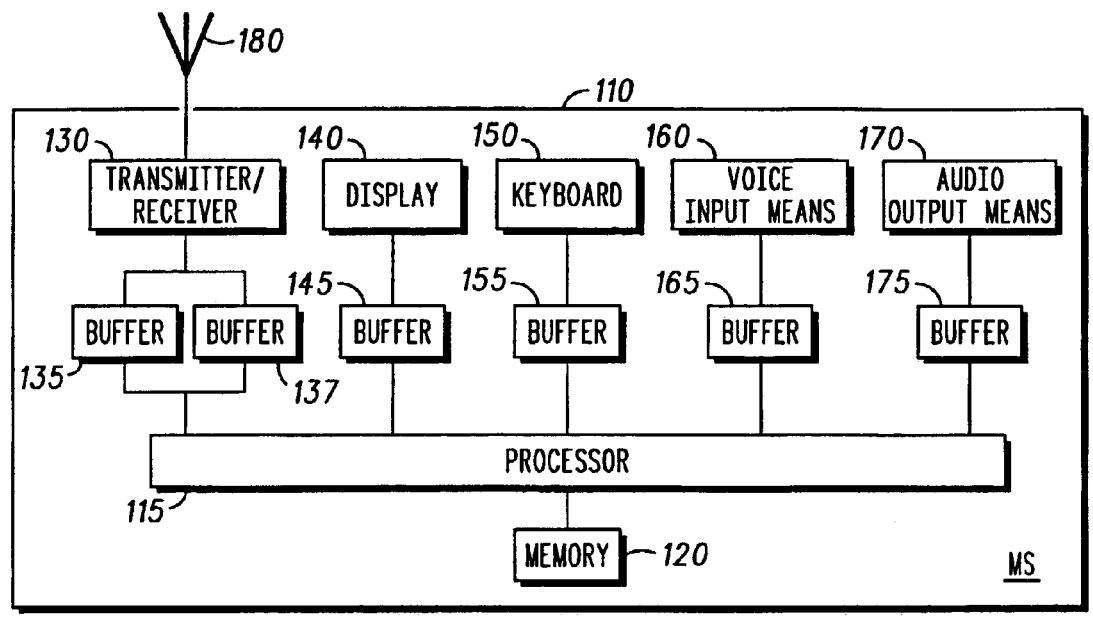
FIG. 1 is a schematic illustration of a user station employed in an embodiment of the present invention.

FIG. 1 shows a mobile station (MS) 110 which is a user station in a cellular communications system and which is in the form of a mobile telephone. MS 110 includes a processor 115. Processor 115 is coupled to memory 120. Processor 115 is also coupled to transmit/receive apparatus 130 via transmit buffer 135 and receiver buffer 137, display 140 via display buffer 145, keyboard 150 via keyboard buffer 155, voice input means 160 via voice input means buffer 165, and audio output means 170 via audio output means buffer 175. The transmit/receive apparatus 130 is further coupled to antenna 180.

Figure 2:
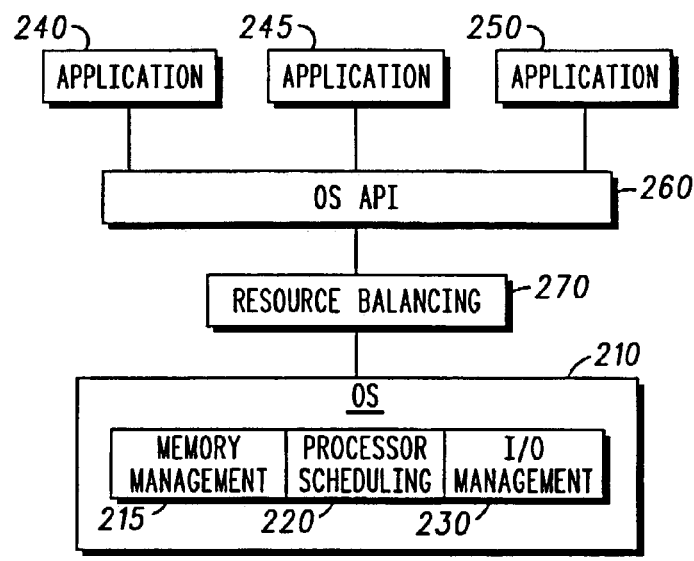
FIG. 2 illustrates functionally an arrangement of an embodiment of the invention.

FIG. 2 schematically illustrates various functional units comprising software modules implemented by processor 115. Processor 115 implements a conventional operating system 210 that carries out the functions of memory management 215, processor scheduling 220 and input/output management 230. The input/output management function 230 handles input/output procedures for each of transmit/receive apparatus 130, display 140, keyboard 150, voice input means 160 and audio output means 170, including control of the respective buffers 135, 137, 145, 155, 165 and 175. Operating system 210 interacts with a plurality of applications, in the present example the three applications 240, 245 and 250, in conventional fashion via operating system application programming interface (API) 260. Additionally, however, a resource balancing function 270 is implemented between operating system API 260 and operating system 210. The resource balancing function 270 modifies or adjusts the interaction taking place between the operating system 210 and the applications 240,245,250. For at least one of the plurality of applications, in this embodiment application 240, the resource balancing function 270 assesses the application's requirements with respect to processing load in association with assessing the requirements for data throughput on a radio link established by antenna 180 of user station 110.

Figure 3:
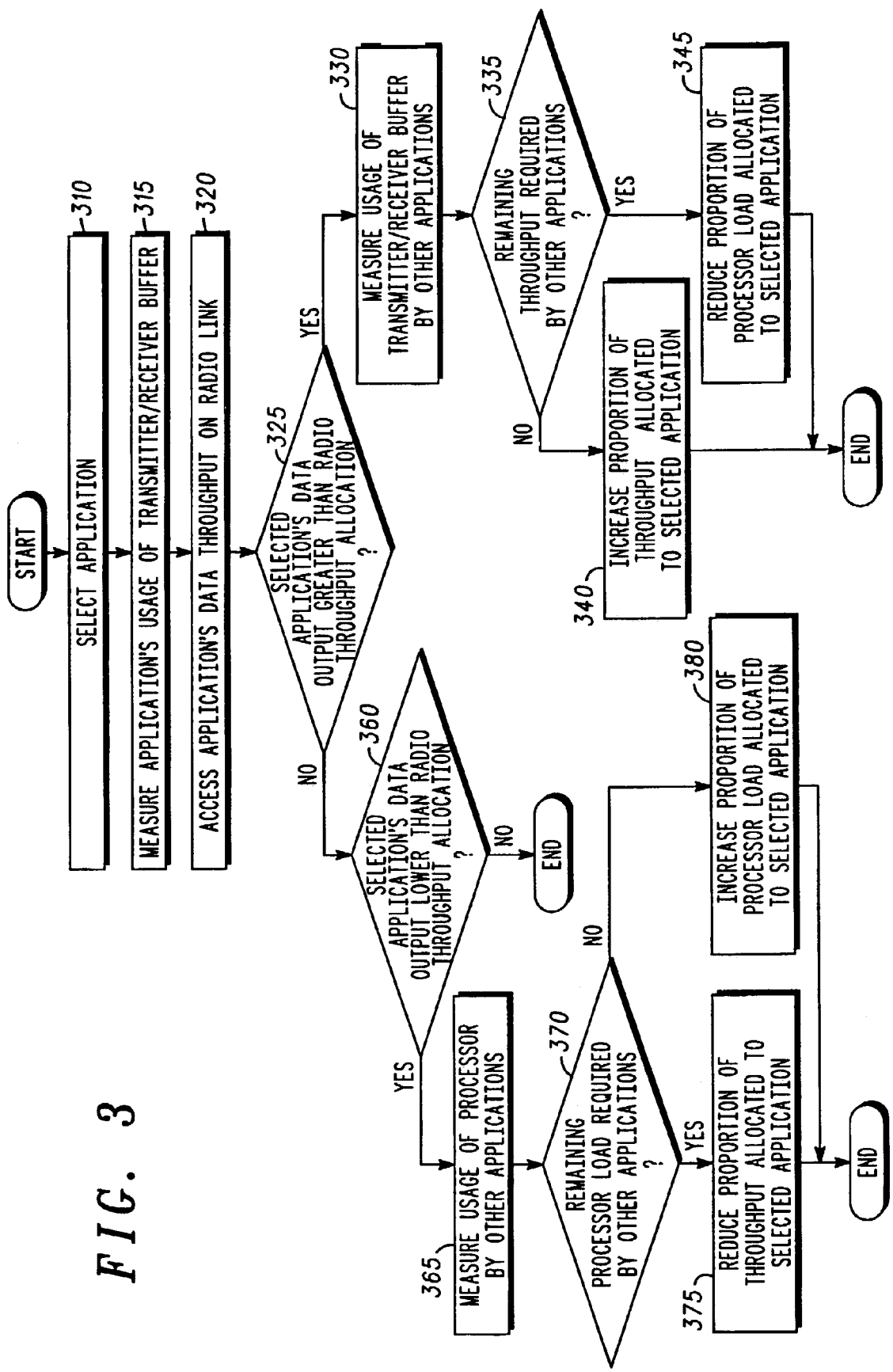
FIG. 3 is a process flow chart of an embodiment of the invention.

The processing steps carried out by processor 115 in implementing the resource balancing function 270 will now be described with reference to FIG. 3. Each of the applications are running simultaneously. In the present example application 240 is a music download application in which music content is downloaded to the MS110. The application receives and stores the music data as it is transmitted from a content server via a BTS of the cellular communications system. A suitable example of such an application is one able to download MP3 music files from the Internet. Application 245 is a multi-media messaging application and application 250 is a mobile shopping/e-commerce application.

Initially processor load or access is shared amongst the applications by the operating system in conventional fashion. Also, initially the available data throughput capacity of the radio link is shared equally between the three applications. Then, after the three applications have been running simultaneously for a predetermined amount of time, or following response to any other suitable triggering mechanism, the resource balancing function 270 selects one of the applications, in this case application 240, as shown at function box 310. Resource balancing function 270 assesses the application's requirement with respect to the cellular communications resource represented by the data throughput capacity available to the application on the radio link. This is performed by means of the step shown in function boxes 315, 320, 325 and 360 as will now be described.

In the present embodiment resource balancing function 270 employs a measurement of the application's usage of the transmit and receive buffers 135 and 137, as shown at function box 315. From this measurement, resource balancing function 270 is able to estimate, i.e. assess, the application's data throughput on the radio link, as shown in function box 320. More particularly, resource balancing function 270 determines whether the application's usage of the transmit and receive buffers is within a predetermined allowable range, or exceeds that range, or is less than that range. When it is determined that the application's usage of the transmit and receive buffers is above the allowed range, then this indicates that the application is producing more data to be transmitted or receiving more data for processing than its allocated share of the cellular communications resource can handle. In other words, as shown at decision box 325, it is determined that the application's data output requirement is indeed greater than its allocated data throughput of the radio link and hence the process moves on to function box 330. In this case, as shown in function box 330, the resource balancing function then measures the amount of usage of the transmit and receive buffers by the remaining applications, namely application 245 and application 250. As shown at decision box 335, the resource balancing function is thus able to determine whether the remaining data throughput resource of the radio link, that is the proportions allocated to application 245 and 250 as opposed to the previously considered proportion allocated to application 240, is fully required by those other applications 245 and 250. More specifically, if the usage by application 245 is less than its intended range, then that indicates that application 245 does not require all of the data throughput allocated to it. The same applies to application 250. In this event, resource balancing function 170 then determines an increased amount of data throughput on the radio link that can be allocated to application 240 and then allocates this increased proportion of the data throughput of the radio link to the selected application 240, as shown in function box 340. In the present embodiment since the user station 110 is employing a radio link of fixed data throughput, this means that application 240 is now allocated an increased proportion of the data throughput which has been made available to it by reducing the portion to either or both of applications 245 and 250. It is noted that in other embodiments user station 110 will be able to acquire an increased level of data throughput on its radio link, in order to provide the required or desired increase of allocation resource to the selected application.

Returning now to decision box 335, if instead resource balancing function 270 had determined that the remaining data throughput capacity of the radio link was indeed required by the other applications 245 and 250, then within the restraints of the present embodiment in which the radio link has a fixed data throughput, the resource balancing function is unable to increase the allocation of the cellular communications resource. In this situation, although the cellular communications resource is not re-allocated between the applications, resource balancing function 270 carries out an alternative improvement, namely it releases some of the selected application's share of the processing load, as shown in function box 345, as the application is not making proper use of this load due to the delays on transmitting or receiving through the radio link. Consequently the other applications, in this case application 245 and application 250, may be allocated an increased amount of processing resource.

If at step 325 it had been determined that the selected application's data output requirement was not greater than is allocated data throughput on the radio link, then as shown at decision box 360, the resource balancing function would next determine whether the application's data output requirement was higher than its allocated data throughput on the radio link. In the present embodiment this will be the case when the application's usage of the transmitter and receive buffers is less than the predetermined specified range mentioned above. In one preferred version of the present embodiment, this assessment would be carried out over a period of time and the result averaged to ensure that it was not just a localised occurrence. If it is determined that the requirement is indeed lower than the allocation, then as shown at function box 365, resource balancing function 270 then measures the usage by the other applications 245 and 250 of their respective shares of the processor load. Resource balancing function 270 then determines, as shown at decision box 370, whether the remaining processing load, that is the processing load allocated to applications 245 and 250 rather than the selected application 240, is indeed being fully used by those applications 245 and 250. If the remaining processor load is not required by the other applications, then as shown at function box 380, the resource balancing function increases the proportion of the processor load allocated to this selected application by reallocating some of the initial share, originally allocated to application 245 and/or application 250, to the selected application 240 instead. This then enables application 240 to run in a more balanced fashion, and to make better usage of its allocated data throughput on the radio link. Meanwhile, operation of application 245 and application 250 is not hindered, as the processor load allocation taken therefrom was not required. If instead during the determination step shown at decision box 370 it was determined that the remaining processor load is indeed required by the other applications, then, as shown at function box 375, the resource balancing function reduces the proportion of the data throughput of the radio link allocated to the selected application, and allocates the saved amount to either or both of applications 245 and 250. Consequently the operation of applications 245 and/or 250 is improved, whilst removing wasted resource allocation in the case of application 240.

When in the determination step shown in decision box 360 it is instead determined that the selected application's data output requirement is not lower than its allocated amount, i.e. the usage by the selected application of the transmit and receive buffers is in the predetermined acceptable range, then application 240 is considered to be operating in a reasonably balanced manner with respect to the different operating resources and no changes are made at this stage.

In the present embodiment the cellular communications resource consisting of the relative amount of data throughput on the radio link is determined in units of kb per second. This type of resource is often referred to in the field of cellular communications systems as bandwidth. In other embodiments any suitable aspect of data throughput or bandwidth in the form of a resource can be allocated and processed as described above. In an arrangement where a multiple number of channels are employed simultaneously by a single user station, data throughput or bandwidth can be expressed in terms of the number of such channels. In yet further embodiments other cellular communications resources can be processed instead of data throughput, including RF channel power, quality of service of the radio link, for example error rates or built-in redundancy levels or degrees of error protection or coding. Another alternative is for time division resolution to be the cellular communication resource processed as above. In further embodiments any two or more of the above possibilities occur in combination.

In the first embodiment described above, the processing resource considered was processor load. An alternative or additional processing resource that can be handled is memory. Memory resources consisting of, for example, usage of RAM and/or database capacity are included.

In a further embodiment, tariff or other price details of the radio communications link are incorporated in the assessment process performed via the resource balancing function. For example, the respective tariffs applicable to the communications links to each of the respective applications may be different. If so, the resource balancing function can be programmed to provide increased communications link throughput to the application using the most expensive link. In this case, the other resources such as memory and/or processing load can be altered accordingly. In a further embodiment the allocation of the different operating resources is altered over time to accommodate communications link tariffs that themselves vary with time. Alternatively, a resource such as memory may be particularly increased for an application in order to prepare it fully prior to use of a communications link having an expensive tariff.

In a further embodiment the resource balancing function also takes into account the selected application's requirement with respect to at least one hardware resource of the user station. Possible hardware resources include the capacity of display 140, the requirement of the application for the user to access keyboard 150, resources related to any subscriber identification module (SIM) card employed in the mobile telephone, likewise battery power consumption. One way in which the resource balancing function can assess the requirements of these capacities is to analyse the usage by respective applications of display buffer 145, keyboard buffer 155, voice input means buffer 165 and audio output means buffer 175. In the case of SIM card resource the SIM card is directly interrogated, and in the case of battery power consumption one way is to interrogate a battery power management function operated by processor 115.

Any of the above embodiments are implementable in any suitable cellular communications system, including UMTS or GPRS systems. In the case of these or any other packet switching system, the communications resource can also be implemented in terms of the proportion of packets allocated to a particular application or some other factor related to packet switching.

In the above embodiments measurements are made of the application's resource requirements as the applications are running. An alternative approach is carried out in the following embodiment which instead employs historical data derived from previous use of the applications.

In this embodiment resource balancing function 270 monitors each of applications 240, 245 and 250 when they are running individually, to assess their respective requirements for memory resource and processing mode, and data throughput of the communications link, when they are running individually. In performing this assessment, resource balancing function 270 may well determine that the use, by one or more of the applications, was in practice less than the requirement for that resource which was indicated to the operating system 210 by the application through the operating system API 260. In this case resource balancing function 270 is able to allocate processing resources and cellular communications resources more appropriately than could be done just by the operating system alone. The present embodiment operates fundamentally along the lines of the first embodiment which as described above with reference to FIG. 3. However, instead of measuring each application's usage of the relevant buffers during ongoing initial use of the applications running simultaneously, in the present embodiment resource balancing function 270 performs advance calculations on the basis of the resource allocation initially intended by the operating system. On the basis of that initial allocation, the resource balancing function assesses, for a selected application, whether its data output requirement will be greater than, lower than, or equal to the intended allocation of data throughput on the radio link. Thereafter it performs the same alternative considerations as outlined with reference to FIG. 3, but in each case on the basis of the intended theoretical allocation of resources rather than by measuring ongoing usage of resources. This procedure is repeated iteratively for each application that is to run simultaneously, resulting in a more balanced allocation of resources between the different applications. The number of iterations can be determined in advance, or can be limited by the criteria of being continued until the iteration results reach a certain degree of conformity.

In the present embodiment the determined levels of resource are then allocated to each application when the applications are consequently run simultaneously. Optionally, once the applications have started to run, a measurement and re-allocation procedure along the lines of the first embodiment or the variations thereof can then be carried out to provide continued balancing of resources.

Similarly when one or more applications are already running on user station 110, and then one or more further applications are intended to be run, either the measurement approach or the calculation approach or a combination of the two can be used to accommodate the impending applications.

As an alternative to the user station deriving the historical data itself as above, the user station may obtain the historical data of one or more of the applications from an appropriate external source. Such an external source can itself derive the historical data based on the experience of a plurality of user stations operating the relevant applications. When the applications to be considered represent a small number of applications from a large number that may be randomly mixed by different users, specific combinations of applications may have been experienced by one or more user stations previously and the recorded resource balancing outcome therefrom can thus be made available to the next user station intending to use those applications in combination.

When the user of user station 110 is roaming, i.e. is obtaining service from a visiting network other than its home network, the historical data may advantageously be obtained nevertheless from the user station's home network. This may well be the case if tariff details of the communication link are different for the user station compared to when the user station is in its home network. In this case resource balancing function 270 can assess the desirability of alternative communication link options presented to it by the home network and/or visiting network in conjunction with the issue of balancing the resources offered by such links with its internal processing resources.

The present invention is particularly advantageous in variable bandwidth systems, as the resource balancing function can adapt the amount of bandwidth requested or used in relation to the other resources. Also, it can avoid unnecessary use of unneeded bandwidth or quality of service in variable bandwidth and/or variable quality of service systems, including bandwidth-on-demand systems.

In the above embodiments, processor 115 is implemented in the form of software running on one or more suitable processors such as a micro-controller or digital signal processor, or is implemented in the form of specifically designed hardware or a combination of hardware and software. The processor can be controlled by processor implementable instructions, for carrying out the method steps described in the above embodiments, which are stored in a storage medium. The storage medium can be a disk, e.g. floppy disk or hard disk, memory such as RAM, or any other appropriate medium. Alternatively the or each processor can receive instructions via a signal carrying the processor implementable instructions.

One quality of service parameter that can be considered as a resource is that of delay. The different applications may well have different requirements with respect to how much delay can be permitted when they are using the communications link. If an application requires minimum delay, that is high quality of service with respect to delay, then the resource balancing function can ensure that it is also allocated a more appropriate amount of processing load or memory allocation compared to another application that has a lower requirement with respect to delay and can therefore afford to produce its data to be transmitted at a likewise slower rate.

We claim:

1. A method of operating a user station in a cellular communications system, the method comprising the steps of:

determining amounts of each of a plurality of operating resources to be allocated to each of a plurality of applications for running on said user station, wherein said plurality of operating resources comprises at least one processing resource and at least one cellular communications resource; and allocating determined amounts of said operating resources to said applications such that one of a cellular communication resource is allocated in response to a processing resource and a processing resource is allocated in response to a cellular communication resource; wherein the step of determining comprises assessing, using historical data obtained by said user station from an external source and derived from previous use of at least one of said plurality of applications by a plurality of user stations, that application's requirement with respect to at least one of said processing resources in association with its requirement with respect to said at least one of cellular communications resources.

2. A method of operating a user station in a cellular communications system according to claim 1, wherein said processing resource is one of the following group:
 (a) processor load;
 (b) memory.

3. A method of operating a user station in a cellular communications system according to claim 1, wherein said at least one cellular communications resource is one of the following group:
 (a) data throughput of a radio link;
 (b) RF channel power;
 (c) quality of service of a radio link;
 (d) time division resolution.

4. A method of operating a user station in a cellular communications system according to claim 1, wherein a requirement with respect to said at least one cellular communications resource is assessed in accordance with a tariff of said cellular communications resource or resources.

5. A method of operating a user station in a cellular communications system according to claim 1, wherein the step of determining further comprises assessing an application's requirements with respect to at least one hardware resource of said user station.

6. A method of operating a user station in a cellular communications system according to claim 5, wherein said at least one hardware resource of said user station is one of the following group:
 (a) display capacity;
 (b) keyboard access;
 (c) SIM card resource;
 (d) battery power consumption.

7. A method of operating a user station in a cellular communications system according to claim 1, wherein said historical data is compiled and/or stored by said user station.

8. A method of operating a user station in a cellular communications system according to claim 1, wherein said user station is roaming and said external source is said user station's home network.

9. A method of operating a user station in a cellular communications system according to claim 1, further comprising using an operating system installed in said user station to control operation of said plurality of applications through an operating system application programming interface, wherein said operating system application programming interface operates independently of the steps of determining and allocating.

10. A method of operating a user station in a cellular communications system according to any claim 1, wherein the step of assessing an application's requirement with respect to at least one of said processing resources in association with its requirement with respect to said at least one of cellular communications resource comprises determining a measure of use of at least one input or output buffer.

11. A method of operating a user station in a cellular communications system according to claim 1, wherein said user station is a mobile station, preferably a mobile telephone or mobile data terminal.

12. A method of operating a user station in a cellular communications system according to any claim 1, wherein said cellular communications system is a UMTS or GPRS system.

13. Apparatus for operating a user station in a cellular communications system, said apparatus comprising:
 means for determining amounts of each of a plurality of operating resources to be allocated to each of a plurality of applications for running on said user station, wherein said plurality of operating resources comprises at least one processing resource and at least one cellular communications resource; and
 means for allocating the determined amounts of said operating resources to said applications such that a cellular communication resource is allocated in response to a processing resource or a processing resource is allocated in response to a cellular communication resource;
 wherein said means for determining comprises means for assessing, using historical data obtained by said user station from an external source and derived from previous use of at least one of said plurality of applications by a plurality of user stations, that application's requirement with respect to at least one of said processing resources in association with its requirement with respect to said at least one of cellular communication resource.

14. Apparatus for operating a user station in a cellular communications system according to claim 13, wherein said processing resource is one of the following group:
 (a) processor load;
 (b) memory.

15. Apparatus for operating a user station in a cellular communications system according to claim 13, wherein said at least one cellular communications resource is one of the following group:
 (a) data throughput of a radio link;
 (b) RF channel power;
 (c) quality of service of a radio link;
 (d) time division resolution.

16. Apparatus for operating a user station in a cellular communications system according to claim 13, further comprising means for assessing a requirement with respect to said at least one of cellular communications resource in accordance with a tariff of said at least one cellular communications resource or resources.

17. Apparatus for operating a user station in a cellular communications system according to claim 13, wherein said means for determining further comprises means for assessing an application's requirements with respect to at least one hardware resource of said user station.

18. Apparatus for operating a user station in a cellular communications system according to claim 17, wherein said hardware resource of said user station is one of the following group:
 (a) display capacity;
 (b) keyboard access;
 (c) SIM card resource;
 (d) battery power consumption.

19. Apparatus for operating a user station in a cellular communications system according to claim 13, wherein said means for determining is operable to use historical data compiled and/or stored by said user station.

20. Apparatus for operating a user station in a cellular communications system according to claim 13, operable when said user station is roaming and said external source is said user station's home network.

21. Apparatus for operating a user station in a cellular communications system according to claim 13, further comprising means for using an operating system installed in said user station to control operation of said plurality of applications through an operating system application programming interface, arranged such that in use said operating system application programming interface operates of said means for determining and allocating.

22. Apparatus for operating a user station in a cellular communications system according to claim 13, wherein said means for assessing an application's requirement with respect to at least one of the processing resources in association with its requirement with respect to said at least one of said cellular communications resources comprises means for determining a measure of use of at least one input or output buffer.

23. Apparatus for operating a user station in a cellular communications system according to claim 13, wherein said user station is a mobile station, preferably a mobile telephone or mobile data terminal.

24. Apparatus for operating a user station in a cellular communications system according to claim 13, wherein said at least one cellular communications system is a UMTS or GPRS system.

25. A cellular communications system user station comprising apparatus according to claim 1.

* * * * *